Figure 1:
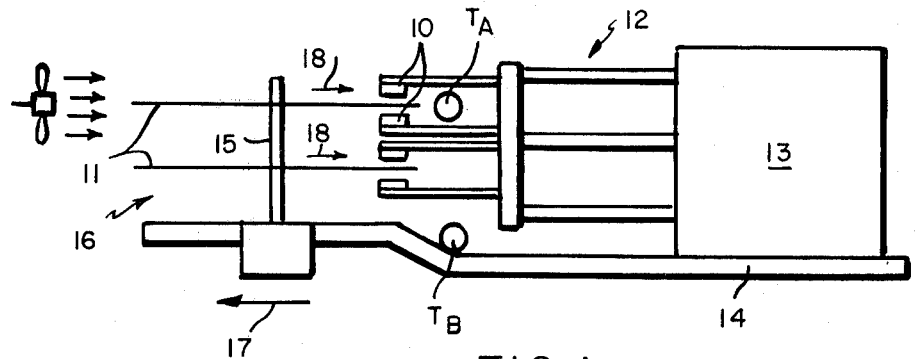

United States Patent [19]

Godbout et al.

[11] 4,056,831

[45] Nov. 1, 1977

[54] THERMAL COMPENSATION FOR DISK PACK SYSTEMS

[75] Inventors: Joseph C. Godbout, Acton; Michael A. Feldstein, Sudbury, both of Mass.

[73] Assignee: Data General Corporation, Southboro, Mass.

[21] Appl. No.: 719,819

[22] Filed: Sept. 1, 1976

[51] Int. Cl.² .................. G11B 21/08; G11B 21/10
[52] U.S. Cl. .................................... 360/77; 360/78
[58] Field of Search .................... 360/77, 78, 109, 133

[56] References Cited

U.S. PATENT DOCUMENTS

| 3,753,254 | 8/1973 | Ruble et al. | 360/77 |
| 3,775,655 | 1/1973 | DuVall | 360/77 |

Primary Examiner—Vincent P. Canney
Attorney, Agent, or Firm—Robert F. O'Connell

[57] ABSTRACT

A temperature compensation technique for memory disk pack systems used in data processing apparatus wherein the temperatures at the base plate and at the disk pack are monitored so as to generate a temperature compensation error signal. Such error signal is supplied to the feedback path of the record/read head position servo loop of the disk pack system when the record/read head has moved to within a selected distance of its commanded position. The overall disk system is enabled only when the temperature error has stabilized to a value below a preselected level.

5 Claims, 3 Drawing Figures

THERMAL COMPENSATION FOR DISK PACK SYSTEMS

INTRODUCTION

This invention relates generally to memory disk packs as for use in data processing systems and, more particularly, to thermal compensation techniques for use therewith.

BACKGROUND OF THE INVENTION

In memory disk equipment used in data processing systems the disk drive positioning systems must be arranged to provide a true positioning of the record/read heads with respect to the data tracks on the disk. During use, changes in temperature cause changes in the dimensions of the mechanical mounting system for the disks and also changes in the dimensions of the disk recording surface, thereby producing undesired errors in the positioning of the head relative to the data tracks. For disks having data track spacing densities of less than 100 tracks per inch, position errors which occur because of temperature changes are not normally significant enough to cause undue concern. However, as the data track spacing density becomes greater than 100 tracks per inch, such position errors become more significant and at track densities of 200 tracks per inch require the use of techniques for compensating for the temperature changes which occur. Errors due to such temperature changes are further aggravated when using disk pack systems wherein the disk packs thereof must be readily interchangeable with one another for use on the same disk drive equipment.

One technique used by those in the art for avoiding such temperature problems has been to provide a sufficient wait time before use of the system when installing a disk or disk pack so that thermal equilibrium is ultimately achieved after one disk pack has been substituted for another. In many cases, however, such wait times are impractical or undesirable in the applications for which the disk system is being used and the system must be ready for relatively immediate use after changing disk packs, when, for example, a relatively hot disk pack is replaced by a relatively cold disk pack, or vice versa. In such a case the system cannot wait until temperature stabilization has occurred.

To overcome such problems, some prior art systems have included specially designed and relatively complex mechanical mounting mechanisms for the track counting device used in the system so as to compensate for position changes which occur from disk pack to disk pack. Such systems are not only relatively costly but also tend to be subject to mechanical difficulties giving rise to problems in reliability. Other prior art systems have suggested that a temperature sensor be utilized to measure the general temperature of the environment in which the base plate casting of the mounting mechanism for the disk pack is situated. The temperature thus monitured is then used to provide adjustments of the record/read head position in accordance therewith. However, such systems do not take into account the temperature in the vicinity of the disk pack itself so that corrections for temperature changes which occur from disk pack to disk pack, particularly where "hot" packs are interchanged with "cold" packs, and vice-versa, cannot be taken care of.

One prior art system which has been designed for remedying such a situation includes a pair of temperature sensing devices, such as thermistors, for monitoring the temperature both at the base plate casting and at the disk pack cartridge itself, the latter device sensing the air temperature at the cartridge. The monitored signals are amplified and the difference therebetween is applied to the available and conventional record/read head servo positioning loop as an additional temperature compensating voltage which is appropriately combined in the servo feedback path with the normal position feedback signal. An example of such a system is that sold under the designation Model D3000 Disk Memory Drive, made and sold by PERTEC Peripheral Equipment. While such a system tends to improve the position accuracy, two additional problems arise therein.

First of all, in such a temperature compensated position servo loop, operation of the overall record/read system normally begins at a fixed time period following turn-on of the position servo loop after a disk pack or cartridge has been installed. The fixed time period as initially designed into the system is selected on the assumption that, at the end thereof, the temperature has adequately stabilized and system operation can thereupon proceed.

However, it is found that in such systems at the end of such fixed time period the temperature has often not stabilized to a desirable level and an abnormally high temperature error still exists, particularly when a "cold" pack has been interchanged with a previously used "hot" pack. In such cases the overall operation of the position servo system tends to deteriorate and the desired positioning accuracy is lost. Moreover, in some cases where the temperature difference between the interchanged disk packs is not so severe, the temperature level stabilizes relatively rapidly and the system is ready for operation well before the end of such fixed time period and yet the system cannot be put into immediate operation. Accordingly, valuable operating time may be lost while awaiting the passage of the fixed time period before operation can begin.

Secondly, such prior art systems are designed so that the temperature compensating error voltage is inserted into the position servo loop immediately upon turn-on thereof. In cases where the record/read head position error is relatively large and where the temperature error is also relatively high, conventional servo loop designs may not be able to readily handle such abnormally high combined errors in order to bring the heads to the commanded position as rapidly and effectively as possible without a more complicated initial re-design of the servo loop for such purpose. Such a prior art system has, accordingly, not provided means for assuring that the temperature compensation errors are inserted into the servo loop system only when the record/read heads are brought to a position which is sufficiently close to the desired commanded position that the servo loop operates as fast and effectively as possible.

BRIEF SUMMARY OF THE INVENTION

The system of the invention provides a relatively inexpensive means for compensating for temperature changes in a disk pack system which produce dimensional changes with respect to the base plate castings on which the disk packs are mounted as well as dimensional changes of the disk surfaces due to the interchanging of disk packs during operation in a manner which permits the disk pack system to begin its operation at the most effective point in time as soon as the overall thermal error is reduced to a tolerable and selectable level. The invention also prevents the temperature compensation from being operative with respect to the position servo loop for the record/read heads until the heads are within a selected distance of their desired position.

In accordance with a preferred embodiment of the invention, the temperatures of both the base plate casting and the disk surface are appropriately monitored, such temperature monitoring being used to provide a temperature compensation error signal which is suitably scaled in terms of the movement of the true position error of the overall servo positioning loop. The temperature compensation error voltage is injected into the position servo loop of the overall disk pack system so as to produce an overall position loop error which moves the record/read heads in the required direction to correct both for position command errors and for dimensional errors caused by the thermal changes in the system.

Means are provided for permitting operation of the overall disk pack system when the temperature error has been reduced to a selected level to insure that such overall system operation does not start either too early, that is, at a point in time when the temperature error is still so high that effective position servo loop operation cannot be obtained, or too late, that is, at a point in time when the temperature has stabilized to a level below the desired level long before system operation is started. Further, the invention in its preferred embodiment includes means for preventing the immediate insertion of the temperature compensation error voltage into the position servo loop at turn-on unless and until the record/read heads have reached a position within a preselected distance from the desired commanded position so that abnormally high temperature errors do not combine with excessively high position command errors so as to slow down or otherwise prevent effective operation of a conventional position servo loop in bringing the heads to the desired position.

DESCRIPTION OF THE INVENTION

Figure 2:
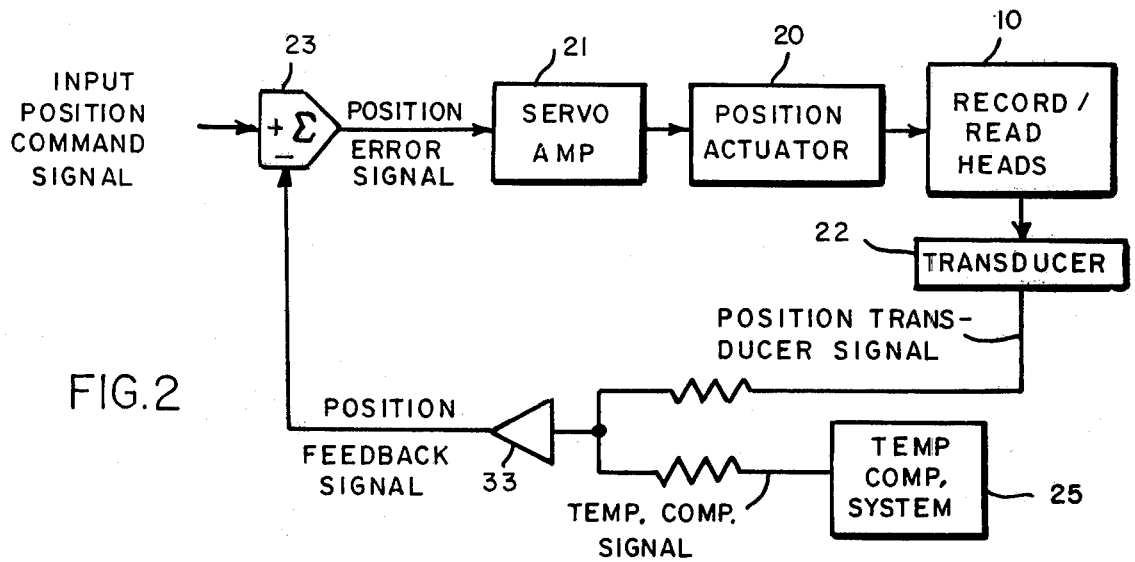
Figure 3:
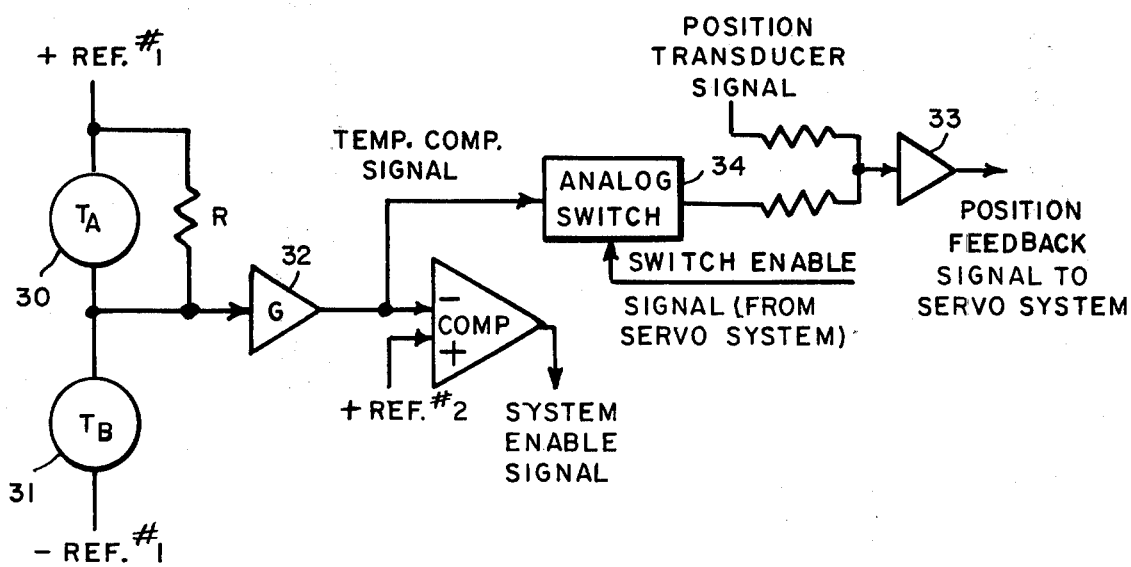

The invention can be described in more detail with the help of the accompanying drawings wherein FIG. 1 shows in diagrammatic form a typical structure of a disk pack system requiring temperature compensation in which the invention can be used;

FIG. 2 shows a block diagram of an overall position servo system for positioning the record/read heads of a typical system such as shown in FIG. 1; and FIG. 3 shows a partial schematic and partial block diagram of the circuitry for providing temperature compensation for the system of FIG. 1.

As can be seen in FIG. 1, a plurality of record/read heads 10 are mounted for positioning with respect to a plurality of disks 11 which have on the surfaces thereof a plurality of data information tracks. The record/read heads are appropriately mounted on a movable structure 12 which can position the heads relative to the surfaces of the disks 11 so as to be located adjacent a desired track thereon. Appropriate positioning means, including mechanical and electrical components therefor, are suitably placed within a housing 13 for such purpose. The housing 13 is fixedly mounted on a base member 14. A rotatable spindle 15 is also appropriately mounted on base member 14 so that the plurality of disks 11 making up a disk pack 16 can be placed thereon for the recording on or the reading of data from the data tracks on the surfaces of such disks. The disks can be arranged, as is well known, to be removably placed on and off from the spindle in a suitable packaged form so that various disk packs can be interchanged for use with the overall record/read system. The details of the structures of such systems are well known to those in the art and need not be discussed in more detail here.

A change in temperature in the vicinity of the system will tend to cause corresponding dimensional changes in various parts thereof. For example, one particularly noticeable problem arises due to the expansion of the base member 14 when the temperature thereof increases, such expansion causing a movement of the spindle in the general direction of arrow 17, as shown. Further, an increase in the temperature in the general vicinity of the disks also causes an expansion of the disk surfaces in the general direction of arrows 18, in effect opposite to that of the base member 14. Such dimensional changes give rise to errors in the desired positioning of the record/read heads relative to the disk surfaces so that when such heads have been appropriately commanded by a conventional position servo system to move to a specified track location, such location while satisfying the position command source will still be in error due to such temperature effects.

In a system which utilizes a track density as high as 100 tracks per inch, or less, the position in accuracy due to temperature effects is much less significant (and can often be ignored) than in a system which utilizes a higher track density, for example, of 200 tracks per inch or more. At higher track densities position errors during the record mode may be such as to cause the recording which is taking place on one track to erase what has already been recorded on an adjacent track. During the read mode, the position of the read head may not be close enough to the desired data track to pick up what has been previously recorded thereon. While a certain amount of error can be tolerated in low track density systems, such error tolerances become impractical for high track densities and it is desirable to provide means for compensating for position errors which are due to temperature changes in the system.

Since the major temperature problems arise due to dimensional changes in the base member and the disk surfaces, the system of the invention is designed to compensate for such major temperature errors, dimensional changes of other portions of the system which give rise to sufficiently insignificant errors being safely ignored. Thus, an appropriate temperature compensation voltage is generated for use in the overall position servo loop of a typical disk pack system as shown in FIG. 2.

As can be seen therein, the record/read heads 10 are appropriately positioned by an actuator 20 in accordance with an input position command signal. In accordance with standard closed-loop servo systems, an appropriate position transducer 22 provides a signal which represents the position of the record/read heads 10 with respect to disks 11. In a conventional position servo system such position transducer signal is fed back for comparison with the input position command voltage signal to produce a position error signal the value of which depends on the difference between the actual position of the heads and the desired position as represented by the command signal. The error signal is supplied to a servo amplifier 21 which then supplies a signal to the actuator 20 so as to move heads 10 in a direction so as to minimize the error.

Such a conventional position servo system will not correct for position offset errors which are introduced because of dimensional changes in the elements thereof due to temperature changes, as discussed above. In order to compensate for such position offsets, a temperature compensation offset signal is supplied to the feedback paths of the position servo loop by a suitable temperature compensation signal generating system 25 in accordance with the invention whereby a temperature compensation signal is added to the position transducer signal to provide a position feedback signal containing an appropriate temperature offset component.

The temperature compensation system 25 is shown in more detail in FIG. 3. As can be seen therein, and with reference to FIG. 1, a first signal is generated by a thermistor device 30 identified as thermistor $T_A$ in FIG. 3 and a second signal is generated by a thermistor device 31 identified as thermistor $T_B$. Thermistor $T_A$ is appropriately mounted by suitable means (not shown) in the general vicinity of one of the sets of record/read heads 10 and the corresponding disk associated therewith, as seen in FIG. 1. A fan 18 blows air across the disk surface toward the thermistor $T_A$ and, accordingly, the thermistor effectively measures the temperature adjacent the surface of the disk 11. Thermistor $T_R$ is mounted at an appropriate point near base member 14 so as to provide an effective measurement of the temperature of such base member. As mentioned above, the temperature changes at the disk pack and at the base member represent those which are apt to provide the most difficulty in achieving accurate positioning in high track density systems. Temperature increases, for example, as measured by thermistors $T_A$ and $T_B$, cause expansion of the regions involved in different directions, i.e., expansion of the disk surfaces is in a direction opposite to that of the base member as discussed above.

Accordingly, thermistor $T_A$ is provided with a positive reference #1 voltage and thermistor $T_B$ with a negative reference #1 voltage so that the summation of the voltages at the input of amplifier 32 represents the overall expansion due to the temperature changes at both regions. The amplifier 32 provides an amplified voltage having a gain G, the latter gain being arranged so that a 1° difference in temperature between the temperature at thermistor $T_A$ and that of thermistor $T_B$ provides a one volt output, the one volt output representing a temperature correction requirement equivalent to 100 micro-inches in the positioning of the record/read heads 10. The output of amplifier 32 thereby represents the temperature compensation signal which is supplied to amplifier 33 via an appropriate switching means, shown as analogue switch 34. The temperature compensation signal is an additional offset signal which is supplied to amplifier 33 together with the conventional position transducer signal from transducer 22. The output of feedback amplifier 33 thereby provides the overall position feedback signal for comparison with the input position command signal at comparison means 23 in the servo loop depicted in FIG. 2.

In the operation of the overall temperature compensation system the temperature compensation signal is not supplied to the servo loop initially until the position servo system causes the record/read heads to move to a position substantially close to that commanded by the input position command signal without temperature compensation. Since position servo systems of such disk pack equipment normally monitor the position of the record/read heads with respect to the desired command position by a suitable position transducer 22, as discussed above, the analog switch can be arranged to be actuated only when the position of the heads is within a selected distance from such desired command position, for example, in a typical system when the head position is within about 300 micro-inches from the commanded position. At such point a switch enable signal is provided from the disk pack system and actuates the switch 34 so that the temperature compensation error signal can then be added to the conventional position servo transducer feedback signal at feedback amplifier 33, as shown.

However, the presence of too large a temperature error will tend to deteriorate the operation of the position servo loop and, hence, the operation of the overall disk pack system so that it is desirable that, while the temperature compensation signal be added in to the position servo loop when the heads are within a selected distance from their command position, the overall disk pack system not be placed into operation for whatever use may be desired until the temperature error has stabilized to a point below a selected level. For example, in a typical system in accordance with the invention, the overall disk pack system should normally not be enabled until the error due to temperature effects is below 400 micro-inches.

Such operation is implemented in accordance with the system of FIG. 3 as follows. When the monitored position of the heads 10 is less than 300 micro-inches from the command position a switch enable signal is supplied from the servo system which thereupon enables analog switch 34 to permit the temperature compensation signal from amplifier 32 to be inserted into the position feedback loop via feedback amplifier 33. If the temperature compensation signal is greater than 400 micro-inches, as represented by a reference #2 voltage at the input to a voltage comparator 35, the temperature compensation signal is still supplied to the feedback loop but no disk pack system enable signal is produced at the output of comparator 35 and the record/read operation of the overall disk pack system remains non-operative. When the temperature stabilizes to a point where the temperature error is less than 400 micro-inches the overall system then becomes operative through the generation of a disk pack system enable signal at the output of comparator 35, the disk pack system during operation then having a suitable temperature compensating error signal still supplied to the position servo loop to correct for temperature errors that may arise.

In summary, the temperature compensating system of the invention operates so that, if a temperature error exists, a suitable temperature compensating error signal is supplied to the position servo loop of a disk pack system when the record/read heads thereof are moved to a position within a selected distance of their commanded position and the overall disk pack system is then placed into operation only when the temperature error has stabilized to within a selected value. Thus, when a "cold" disk pack, for example, is placed into a previously operating disk system i.e., to replace a "hot" disk pack, as soon as the record/read heads are moved to within a selected distance of the commanded position and the temperature error is not too great, i.e., the temperature has stabilized to a desired level, the disk pack system is put into operation at the most effective point in time with effectively full temperature compensation.

What is claimed is:

1. Temperature compensation means for disk storage systems which include a base member, means for mounting one or more disks having a plurality of data information tracks, one or more record/read heads capable of being movably positioned with respect to said tracks for recording data information on or reading data information from said tracks, and position servo loop means for controlling the movement of said one or more heads to a commanded position in response to a position command signal, said loop means including means for providing a position feedback signal representing the position of said one or more heads with respect to said tracks, said temperature compensation means comprising temperature error sensing means for providing a temperature compensation error signal;

means for combining said temperature compensation error signal with said position feedback signal to provide a combined feedback signal and for supplying said combined feedback signal to said position servo loop, and means responsive to said temperature compensation error signal for producing a disk storage system enable signal when said temperature compensation error signal is below a selected amplitude level.

2. Temperature compensation means in accordance with claim 1 wherein said disk storage system enable signal producing means includes means for comparing the amplitude level of said temperature compensation error signal with the amplitude level of a selected reference signal to produce said disk storage system enable signal when the amplitude level of said temperature compensation error signal is below the amplitude level of said reference signal.

3. Temperature compensation means in accordance with claim 1 and further including means for permitting the combining of said temperature compensation error signal with said position feedback signal only when the position of said one or more heads is at a distance from said commanded position which is less than a selected distance.

4. Temperature compensation means in accordance with claim 3 wherein said permitting means comprises switch means for supplying, when actuated, said temperature compensation error signal to said combining means.

5. Temperature compensation means in accordance with claim 4 wherein said switch means is an analogue switch.

* * * * *